(12) United States Patent
Kim

(10) Patent No.: US 12,008,270 B2
(45) Date of Patent: *Jun. 11, 2024

(54) SYSTEM, DEVICE, AND METHOD FOR MEMORY INTERFACE INCLUDING RECONFIGURABLE CHANNEL

(71) Applicant: SAMSUNG ELECTRONICS CO., LTD., Suwon-si (KR)

(72) Inventor: Youngwook Kim, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 13 days.

This patent is subject to a terminal disclaimer.

(21) Appl. No.: 17/994,077

(22) Filed: Nov. 25, 2022

(65) Prior Publication Data
US 2023/0092562 A1    Mar. 23, 2023

Related U.S. Application Data

(63) Continuation of application No. 17/209,790, filed on Mar. 23, 2021, now Pat. No. 11,556,279.

(30) Foreign Application Priority Data

Aug. 21, 2020 (KR) .................. 10-2020-0105538
Nov. 10, 2020 (KR) .................. 10-2020-0149596

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0659; G06F 3/0604; G06F 3/0679
See application file for complete search history.

(56) References Cited

U.S. PATENT DOCUMENTS

| | | | |
|---|---|---|---|
| 5,901,332 | A | 5/1999 | Gephardt et al. |
| 10,372,658 | B2 | 8/2019 | Kim |
| 10,419,574 | B2 | 9/2019 | Rowley et al. |
| 10,956,342 | B1 * | 3/2021 | MacLaren ........... G06F 12/1425 |
| 2007/0226403 | A1 | 9/2007 | Son |
| 2009/0177849 | A1 | 7/2009 | Mazzola et al. |
| 2009/0327596 | A1 | 12/2009 | Christenson et al. |
| 2010/0017562 | A1 * | 1/2010 | Nagadomi ............ G06F 3/0656 |
| | | | 711/E12.001 |

(Continued)

FOREIGN PATENT DOCUMENTS

| | | |
|---|---|---|
| KR | 1020190143155 | 12/2019 |
| WO | 2007-005693 A2 | 1/2007 |

OTHER PUBLICATIONS

European Search Report dated Dec. 14, 2021 Cited in EP Patent Application No. 21178503.5.

*Primary Examiner* — Ryan Bertram
(74) *Attorney, Agent, or Firm* — Fish & Richardson P.C.

(57) ABSTRACT

A method of communicating with a memory device through a plurality of sub-channels and a control sub-channel includes; setting a first mode or a second mode. In the first mode, writing or reading first data corresponding to a command synchronized to the control sub-channel through the plurality of sub-channels, and in the second mode, independently writing or reading second data and third data respectively corresponding to different commands synchronized to the control sub-channel through the plurality of sub-channels.

20 Claims, 12 Drawing Sheets

(56) References Cited

U.S. PATENT DOCUMENTS

| | | | |
|---|---|---|---|
| 2010/0036997 A1 | 2/2010 | Brewer et al. | |
| 2011/0219197 A1* | 9/2011 | Perego | G06F 13/1684 |
| | | | 711/E12.001 |
| 2011/0302361 A1* | 12/2011 | Yamazaki | G11C 16/349 |
| | | | 711/E12.008 |
| 2013/0227246 A1* | 8/2013 | Hirao | G06F 12/0246 |
| | | | 711/206 |
| 2014/0029341 A1* | 1/2014 | In | G11C 11/5628 |
| | | | 365/185.12 |
| 2015/0092484 A1* | 4/2015 | Lee | G11C 7/1006 |
| | | | 365/174 |
| 2016/0054947 A1* | 2/2016 | Liu | G06F 3/0634 |
| | | | 711/170 |
| 2018/0059976 A1 | 3/2018 | Helmick et al. | |
| 2019/0042150 A1* | 2/2019 | Wells | G06F 3/0688 |
| 2019/0373076 A1 | 12/2019 | Rowley et al. | |
| 2019/0391938 A1 | 12/2019 | Lee et al. | |
| 2020/0218468 A1* | 7/2020 | Hsu | G06F 3/0683 |
| 2021/0389895 A1* | 12/2021 | Pekny | G06F 3/0659 |

\* cited by examiner

SYSTEM, DEVICE, AND METHOD FOR MEMORY INTERFACE INCLUDING RECONFIGURABLE CHANNEL

CROSS-REFERENCE TO RELATED APPLICATION

This is a Continuation of U.S. application Ser. No. 17/209,790, filed Mar. 23, 2021, and a claim priority under 35 U.S.C. § 119 is made to Korean Patent Application No. 10-2020-0105538 filed on Aug. 21, 2020, and Korean Patent Application No. 10-2020-0149596 filed on Nov. 10, 2020, the collective subject matter of which is hereby incorporated by reference.

BACKGROUND

The inventive concept relates generally to memory interfaces, and more particularly, to systems, apparatuses, and methods associated with a memory interface including a reconfigurable channel.

Storage devices are used in many different applications to store data. Among storage devices, semiconductor-based storage devices have been widely adopted as they offer high data storage capacity and may be variously accessed using one or more of channels. In this regard, a greater number of available channels increases the rate at which memory device(s) may be accessed. However, the number of channels in a storage device may be limited by such factors as parasitic components and complexity of connection with memory device(s). Therefore, a memory interface that efficiently accesses high-capacity memory devices is desired.

SUMMARY

Embodiments of the inventive concept provide systems, apparatuses, and methods for a memory interface providing efficient access to memory devices through a reconfigurable channel.

According to an aspect of the inventive concept, there is provided a device configured to communicate with a memory device through a reconfigurable channel. The device includes; a first interface circuit connected to the memory device through a first sub-channel, a second interface circuit connected to the memory device through a second sub-channel, a third interface circuit connected to the memory device through a control sub-channel, and a control circuit configured to set one of a first mode and a second mode, and further configured to control the first interface circuit, the second interface circuit, and the third interface circuit, wherein the first interface circuit and the second interface circuit communicate first data corresponding to a command synchronized to the control sub-channel in the first mode, and respectively communicate second data and third data corresponding to different commands synchronized to the control sub-channel in the second mode.

According to an aspect of the inventive concept, there is provided a system including; a memory device including cell arrays, and a memory controller connected to the memory device through a control sub-channel and a plurality of sub-channels. The memory controller is configured to set one of a first mode and a second mode, write or read first data corresponding to a command synchronized to the control sub-channel through the plurality of sub-channels in the first mode, and independently write or read second data and third data corresponding to different commands synchronized to the control sub-channel through the plurality of sub-channels in the second mode.

According to an aspect of the inventive concept, there is provided a method of communicating with a memory device through a plurality of sub-channels and a control sub-channel. The method includes; setting one of a first mode and a second mode, in the first mode, writing or reading first data corresponding to a command synchronized to the control sub-channel through the plurality of sub-channels, and in the second mode, independently writing or reading second data and third data respectively corresponding to different commands synchronized to the control sub-channel through the plurality of sub-channels.

BRIEF DESCRIPTION OF THE DRAWINGS

The making and use of the inventive concept may be clearly understood upon consideration of the following detailed description taken together with the accompanying drawings in which.

DETAILED DESCRIPTION

Throughout the written description and drawings, like reference numbers and labels denote like or similar elements, features and/or method steps.

Figure 1:
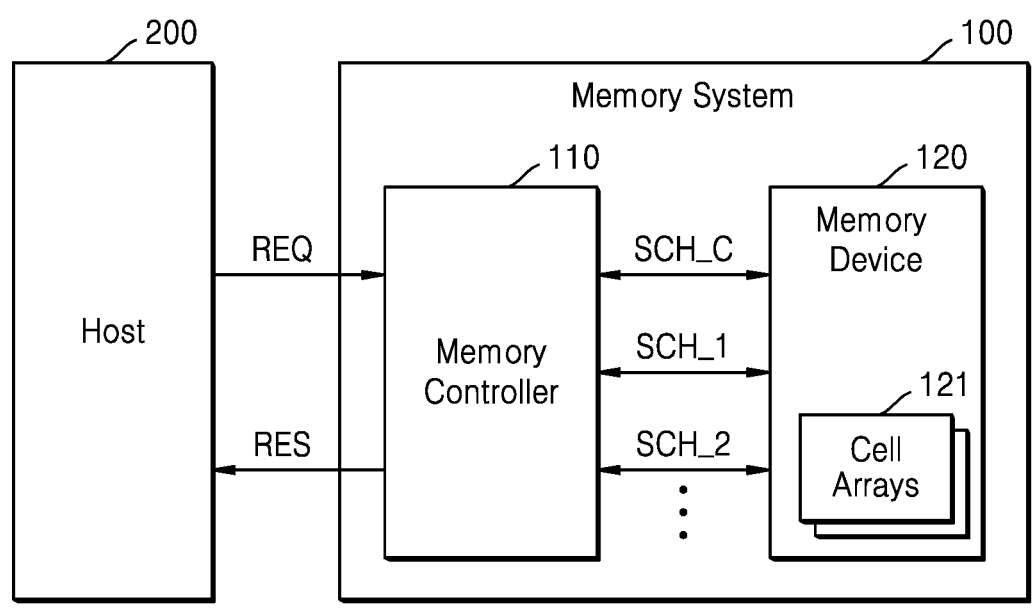
FIG. 1 is a block diagram illustrating a host and a memory system according to an embodiment.

FIG. 1 is a block diagram illustrating a host 200 and a memory system 100 according to embodiments of the inventive concept.

The host 200 may refer to any device that communicates (e.g., transmits and/or receives data, an address and/or a command) with the memory system 100. For example, the host 200 may include at least one programmable device like a central processing unit (CPU), a digital signal processor (DSP), a graphics processing unit (GPU), and a neural network processing unit (NPU), may include a reconfigurable device like a field programmable gate array (FPGA), and may include a device providing a fixed function like an intellectual property (IP) core. Also, the memory system 100 may be detachably coupled to the host 200, and the host 200 may be a computing system to which the memory system 100 is coupled. The host 200 may communicate with the memory system 100 based on an arbitrary protocol. As examples, the host 200 may communicate with the memory system 100 based on a serial advanced technology attachment (SATA) interface, a peripheral component interconnect express (PCIe) interface, a universal serial bus (USB), a universal flash storage (UFS) interface, an embedded multimedia controller (eMMC) interface, etc. As shown in FIG. 1, the host 200 may transmit a request REQ to the memory system 100 and may receive a response RES from the memory system 100.

The memory system 100 may refer to any storage device or storage system including the memory device 120. For example, the memory system 100 may include a solid-state drive (SSD), a universal flash storage (UFS), an embedded UFS (eUFS), a multimedia card (MMC), etc. As shown in FIG. 1, the memory system 100 may include a memory controller 110 and a memory device 120. In some embodiments, as will be described hereafter with reference to FIG. 13, the memory system 100 may also include a plurality of memory devices.

The memory device 120 may include cell arrays 121, wherein each of the cell arrays 121 may be independently accessed. In some embodiments, the memory device 120 may include planes respectively corresponding to the cell arrays 121, as will be described hereafter with reference to FIG. 3. In some embodiments, the memory device 120 may include dies respectively corresponding to the cell arrays 121, as will be described hereafter with reference to FIG. 9. In some embodiments, the cell arrays 121 may include volatile memory cells, and the memory device 120 may include, a dynamic random access memory (DRAM), a static random access memory (SRAM), etc. In some embodiments, the cell arrays 121 may include non-volatile memory cells, and the memory device 120 may include, flash memory or a resistive random access memory (RRAM), etc. Hereinafter, certain embodiments will be described under an assumption that the memory device 120 including NAND flash memory, but the inventive concept is not limited thereto.

The memory controller 110 may communicate with the host 200 and the memory device 120 using one or more interface(s). Here, an interface between the memory controller 110 and the host 200 may be referred to as a host interface, and an interface between the memory controller 110 and the memory device 120 may be referred to as a memory interface. The memory controller 110 may communicate with the memory device 120 based on a request REQ received from the host 200 and provide a response RES corresponding to the request REQ to the host 200. For example, the memory controller 110 may read data from the memory device 120 in response to a read request received from the host 200 and may provide a response RES including read data to the host 200. Also, the memory controller 110 may write data to the memory device 120 in response to a write request received from the host 200 and may provide a response RES indicating completion of writing data to the host 200.

The memory interface may include at least one channel including a number of sub-channels. For example, as shown in FIG. 1, the memory controller 110 may communicate with the memory device 120 through a channel including a control sub-channel SCH_C, as well as a plurality of sub-channels SCH_1, SCH_2, etc. In some embodiments, as will be described hereafter with reference to FIG. 13, the memory controller 110 may alternately communicate with a plurality of memory devices through a single channel or a plurality of channels. Here, it is assumed that the memory controller 110 provides at least one control signal to the memory device 120 through the control sub-channel SCH_C. Also, the memory controller 110 may transmit command(s), address(es), and/or data to the memory device 120, and/or receive data from the memory device 120 through at least one of the sub-channels (e.g., sub-channels SCH_1, SCH_2). Here, the sub-channels SCH_1, SCH_2, may be referred to as data sub-channels.

The sub-channels SCH_1, SCH_2 may share the control sub-channel SCH_C. For example, the sub-channels SCH_1, SCH_2, may each transmit a command, an address, and/or data corresponding to at least one control signal transmitted from the memory controller 110 to the memory device 120 through the control sub-channel SCH_C. The memory controller 110 may set one of a plurality of modes, may use the sub-channels SCH_1, SCH_2, to communicate common data according to a set mode, and may use the sub-channels SCH_1, SCH_2, independently from one another to communicate data. For example, the memory controller 110 may use the sub-channels SCH_1, SCH_2 to communicate first data corresponding to a command synchronized to the control sub-channel SCH_C in a first mode and may also use the sub-channels SCH_1, SCH_2 to communicate second data and third data each corresponding to different commands, respectively, synchronized to the control sub-channel SCH_C in a second mode. As a result, the first mode may provide high data throughput in the memory interface, and the second mode may provide low latency in the memory interface.

The memory controller 110 may select an optimum mode, as between the first mode and the second mode, based on requests received from the host 200 and/or a separate control signal. For example, the memory controller 110 may select the first mode when multiple read requests are successively received, or when multiple write requests are successively received. Alternately, the memory controller 110 may select the second mode when read requests and write requests are non-sequentially received (or relatively intermixed). Accordingly, the memory system 100 may not only rapidly process successive requests received from the host 200, but also quickly return a response RES corresponding to the request REQ to the host 200. Also, the number of channels may be reduced because the sub-channels SCH_1, SCH_2 share the control sub-channel SCH_C as described above, and thus the memory system 100 may have a relatively simple structure providing improved memory system reliability.

Hereinafter, as a teaching example, it is assumed that the memory device 120 includes a first cell array and a second cell array which are independently accessible. It is further assumed that the memory controller 110 and the memory device 120 communicate with each other through a first channel SCH_1 and a second channel SCH_2 from among a plurality of sub-channels. However, those skilled in the art will understand that these embodiments are merely examples of a variety of memory devices, memory controllers, channels, and/or sub-channels that may be variously used in the context of the inventive concept.

Figure 2:
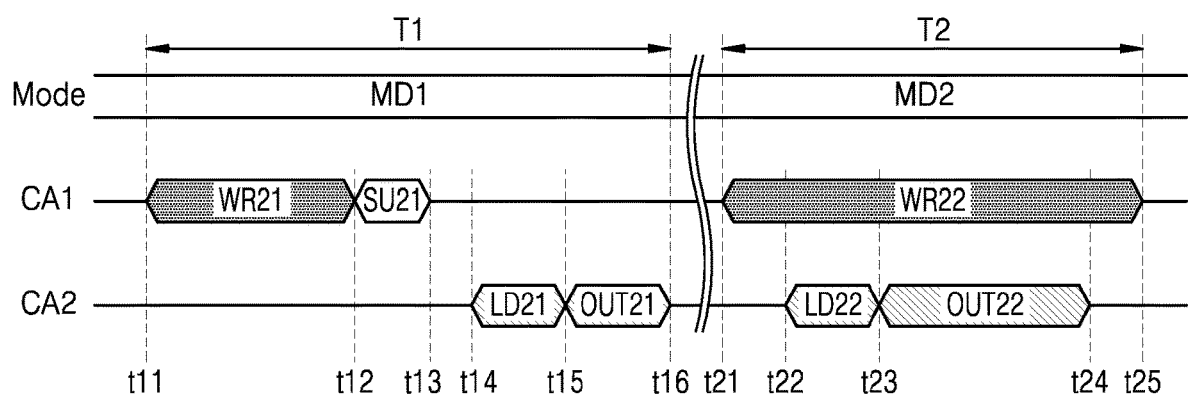
FIGS. 2, 7, 8 and 10 are respective timing diagrams variously illustrating operation of memory device according to embodiments of the inventive concept.

FIG. 2 is a timing diagram illustrating an operation of the memory device 120 according to embodiments of the inventive concept. That is, the timing diagram of FIG. 2 illustrates operation of the memory device 120 in a first mode MD1 and in a second mode MD2. Here, it is assumed that the memory device 120 includes a first cell array CA1 and a second cell array CA2 which may be independently accessed. It is also assumed that respective sizes of data written to the memory device 120 in the first mode MD1, and data written to the memory device 120 in the second mode MD2 are the same. Likewise, it is assumed that respective sizes of data read from the memory device 120 in the first mode MD1, and data read from the memory device 120 in the second mode MD2 are the same.

Referring to FIGS. 1 and 2, during a period extending from time t11 to time t12, a first write operation WR21 may be performed in the first cell array CA1. For example, the memory controller 110 may receive a write request including an address corresponding to a region of the first cell array CA1 from the host 200, and, in response to the write request, the memory controller 110 may provide a write command, an address, and data to the memory device 120. Since the memory device 120 is set to the first mode MD1, data may be provided to the memory device 120 through the first sub-channel SCH_1 and the second sub-channel SCH_2 during the first write operation WR21. Therefore, the first write operation WR21 may be completed earlier than a second write operation WR22 described hereafter.

During a period extending from time t12 to time t13, a suspend operation SU21 may be performed in the first cell array CA1. For example, when a read request is received from the host 200 while successive write operations are being performed, the memory controller 110 may suspend the write operations and start the read operation. Assuming the use of flash memory, a write operation may include iteratively performed programming and verification operations. Accordingly, the memory device 120 may perform the suspend operation SU21 before the read operation to suspend a write operation being performed in order to start the read operation.

During a period extending from time t14 to time t15, a first load operation LD21 may be performed in the second cell array CA2. For example, the memory controller 110 may receive a read request including an address corresponding to a region of the second cell array CA2 from the host 200 and provide a read command and the address to the memory device 120 between time t13 and time t14. Therefore, during the first load operation LD21, data may be loaded from the second cell array CA2 to a page buffer.

During a period extending between time t15 to time t16, a first output operation OUT21 may be performed in the second cell array CA2. For example, data loaded to the page buffer during the first load operation LD21 may be output from the memory device 120 during the first output operation OUT21. Since the memory device 120 is set to the first mode MD1, data may be provided to the memory controller 110 through the first sub-channel SCH_1 and the second sub-channel SCH_2 during the first output operation OUT21. Therefore, the first output operation OUT21 may be completed earlier than a second output operation OUT22 described hereafter.

At time t21, the second write operation WR22 may be performed in the first cell array CAL. For example, the memory controller 110 may receive a write request including an address corresponding to a region of the first cell array CA1 from the host 200, and, in response to the write request, the memory controller 110 may provide a write command, an address, and data to the memory device 120. Since the memory device 120 is set to the second mode MD2, data may be provided to the memory device 120 through the first sub-channel SCH_1 during the second write operation WR22. Therefore, the second write operation WR22 may be completed at a delayed time as compared to the first write operation WR21.

During a period extending between time t22 to time t23, a second load operation LD22 may be performed in the second cell array CA2. For example, the memory controller 110 may receive a read request including an address corresponding to a region of the second cell array CA2 from the host 200 and provide a read command and the address to the memory device 120 between time t21 and time t22. Since the memory device 120 is set to the second mode MD2, the second write operation WR22 in the first cell array CA1 may not be suspended, and a read operation in the second cell array CA2 may be performed. Therefore, a suspend operation may be omitted in the first cell array CA1, and data may be loaded from the second cell array CA2 to a page buffer during the second load operation LD22.

During a period extending between time t23 to time t24, the second output operation OUT22 may be performed in the second cell array CA2. For example, data loaded to the page buffer during the second load operation LD22 may be output from the memory device 120 during the second output operation OUT22. Since the memory device 120 is set to the second mode MD2, data may be provided to the memory controller 110 through the second sub-channel SCH_2 during the second output operation OUT22. Therefore, the second output operation OUT22 may be completed at a delayed time as compared to the first output operation OUT21 described above.

At time t25, the second write operation WR22 in the first cell array CA1 may be completed. Due to data received through the first sub-channel SCH_1 in the second mode MD2, a period during which the second write operation WR22 is performed may become longer than a period during which the first write operation WR21 is performed. However, due to the read operation in the second cell array CA2 performed in parallel with the second write operation WR22 and the omitted suspend operation, a second execution time T2 required to write and read data in the second mode MD2 may be shorter than a first execution time T1 required to write and read data in the first mode MD1 (T2<T1). As a result, the memory controller 110 may improve the performance of the memory system 100 by appropriately setting (or selecting between) the first mode MD1 or the second mode MD2 as circumstances dictate.

Figure 3:
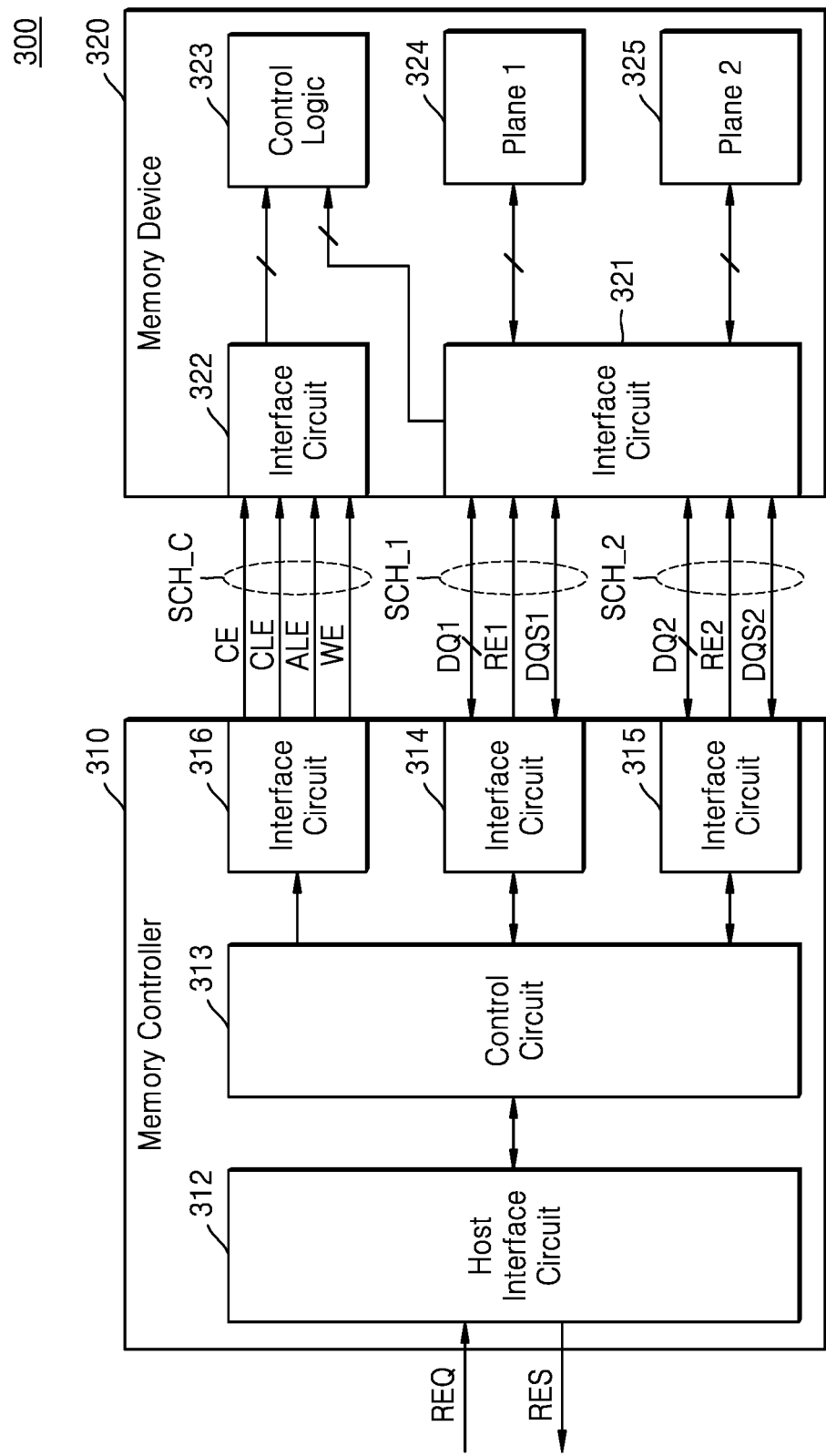
FIG. 3 is a block diagram illustrating a memory system according to embodiments of the inventive concept.

FIG. 3 is a block diagram illustrating a memory system 300 according to embodiments of the inventive concept. Referring to FIG. 3, the memory system 300 may generally include a memory controller 310 (as one example of a broad class of "devices" accessing a memory device) and a memory device 320, wherein a memory interface between the memory controller 310 and the memory device 320 may include the control sub-channel SCH_C and a plurality of data sub-channels (e.g., a first sub-channel SCH_1 and a second sub-channel SCH_2).

The control sub-channel SCH_C may include at least one signal line through which at least one control signal is communicated. For example, as shown in FIG. 3, the control sub-channel SCH_C may include signal lines through which a chip enable signal CE, a command latch enable signal CLE, an address latch enable signal ALE, and a write enable signal WE are respectively communicated. For example, the signal lines through which the chip enable signal CE, the command latch enable signal CLE, the address latch enable signal ALE, and the write enable signal WE are communicated may be respectively referred to as a chip enable line, a command latch enable line, an address latch enable line, and a write enable line. In some embodiments, the chip enable signal CE and the write enable signal WE may be active-low signals.

Each data sub-channel may include data lines, a data strobe line and a read enable line. For example, as shown in FIG. 3, the first sub-channel SCH_1 may include first data lines communicating a first data signal DQ1, a first data strobe line communicating a first data strobe signal DQS1, and a first read enable line communicating a first read enable signal RE1. Likewise, the second sub-channel SCH_2 may include second data lines communicating a second data signal DQ2, a second data strobe line communicating a second data strobe signal DQS2, and a second read enable line communicating a second read enable signal RE2. The collection of first data lines and the collection of second data lines may be referred to as respective DQ buses. In some embodiments, the first data signal DQ1 and the second data signal DQ2 may be transmitted through a serial interface, and the first sub-channel SCH_1 and the second sub-channel SCH_2 may each include at least one signal line (e.g., a differential signal line) for the first data signal DQ1 and the second data signal DQ2.

The memory controller 310 may transmit data to the memory device 320, receive data from the memory device 320, or transmit a command and an address to the memory device 320 through the first data lines and/or the second data lines. The memory device 320 may identify each of signals transmitted and received through the first data lines and the second data lines as one of a command, an address, and data based on control signals received through the control sub-channel SCH_C. In some embodiments, the first read enable signal RE1 and the second read enable signal RE2 may be active-low signals.

Referring to FIG. 3, the memory controller 310 may include a host interface circuit 312, a control circuit 313, and first, second and third (hereafter, "first to third") interface circuits 314, 315 and 316. The host interface circuit 312 may provide a host interface with a host (e.g., 200 of FIG. 1), receive a request REQ from the host and transmit the request REQ to the control circuit 313, and provide a response RES to the host based on a signal provided from the control circuit 313. A first interface circuit 314 may access the memory device 320 through the first sub-channel SCH_1, a second interface circuit 315 may access the memory device 320 through the second sub-channel SCH_2, and a third interface circuit 316 may access the memory device 320 through the control sub-channel SCH_C. In some embodiments, the first to third interface circuits 314, 315 and 316 may each be connected to pins exposed to the outside of the memory controller 310 and may include signal buffers connected to the corresponding pins.

The control circuit 313 may set a first mode or a second mode and may control the first to third interface circuits 314, 315 and 316. For example, in the first mode, the control circuit 313 may control the first interface circuit 314 and the second interface circuit 315 to communicate first data (e.g., D1 of FIG. 4A) corresponding to commands synchronized to the control sub-channel SCH_C (or control signals transmitted through the control sub-channel SCH_C). Also, in the second mode, the control circuit 313 may control the first interface circuit 314 and the second interface circuit 315 to communicate each of second data (e.g., D2 of FIG. 4B) and third data (e.g., D3 of FIG. 4B) respectively corresponding to different commands synchronized to the control sub-channel SCH_C.

Referring to FIG. 3, the memory device 320 may include a fourth interface circuit 321, a fifth interface circuit 322, control logic 323, a first plane 324, and a second plane 325. The first plane 324 and the second planes 325 may each include cell arrays that are accessible independently from each other and may be controlled by the control logic 323. Here, a function providing independent access to various planes may be referred to as a plane independent command (PIC) function. The fourth interface circuit 321 may access the memory controller 310 through the first sub-channel SCH_1 and the second sub-channel SCH_2, and the fifth interface circuit 322 may access the memory controller 310 through the control sub-channel SCH_C.

The fourth interface circuit 321 may provide the first read enable signal RE1 and the second read enable signal RE2 received through the first sub-channel SCH_1 and the second sub-channel SCH_2 to the control logic 323. During a write operation, the fourth interface circuit 321 may identify data from the first data signal DQ1 and/or the second data signal DQ2 based on the first data strobe signal DQS1 and/or the second data strobe signal DQS2 and provide identified data to the first plane 324 and/or the second plane 325 under the control of the control logic 323. Also, during a read operation, the fourth interface circuit 321 may generate the first data signal DQ1 and/or the second data signal DQ2 from data received from the first plane 324 and/or the second plane 325 under the control of the control logic 323 and may generate the first data strobe signal DQS1 and/or the second data strobe signal DQS2.

The fourth interface circuit 321 may latch commands from the first data signal DQ1 and/or the second data signal DQ2 under the control of the control logic 323 that received a command latch enable signal CLE through the fifth interface circuit 322 and provide latched commands to the control logic 323. Also, the fourth interface circuit 321 may latch addresses from the first data signal DQ1 and/or the second data signal DQ2 under the control of the control logic 323 that received an address latch enable signal ALE through the fifth interface circuit 322 and provide at least some of latched addresses to the first plane 324 and/or the second plane 325.

The control logic 323 may receive a command for setting a first mode or a second mode from the memory controller 310 and control the fourth interface circuit 321, the first plane 324, and the second plane 325 based on the received command. For example, the control logic 323 may control the fourth interface circuit 321 to latch a command, based on control signals provided from the fifth interface circuit 322. The control logic 323 may receive a command from the fourth interface circuit 321 and may identify a first mode or a second mode based on the received command. When the first mode is identified, the control logic 323 may control the fourth interface circuit 321, such that the first sub-channel SCH_1 and the second sub-channel SCH_2 are mapped to the first plane 324 or the second plane 325. Alternately, when the second mode is identified, the control logic 323 may control the fourth interface circuit 321, such that the first sub-channel SCH_1 and the second sub-channel SCH_2 are mapped to the first plane 324 and the second plane 325, respectively. Therefore, as described in relation to FIG. 2, each of the first plane 324 and the second plane 325 may communicate data through both the first sub-channel SCH_1 and the second sub-channel SCH_2 in the first mode, and communicate data through at least one of the first sub-channel SCH_1 and the second sub-channel SCH_2 in the second mode.

Figure 4A:
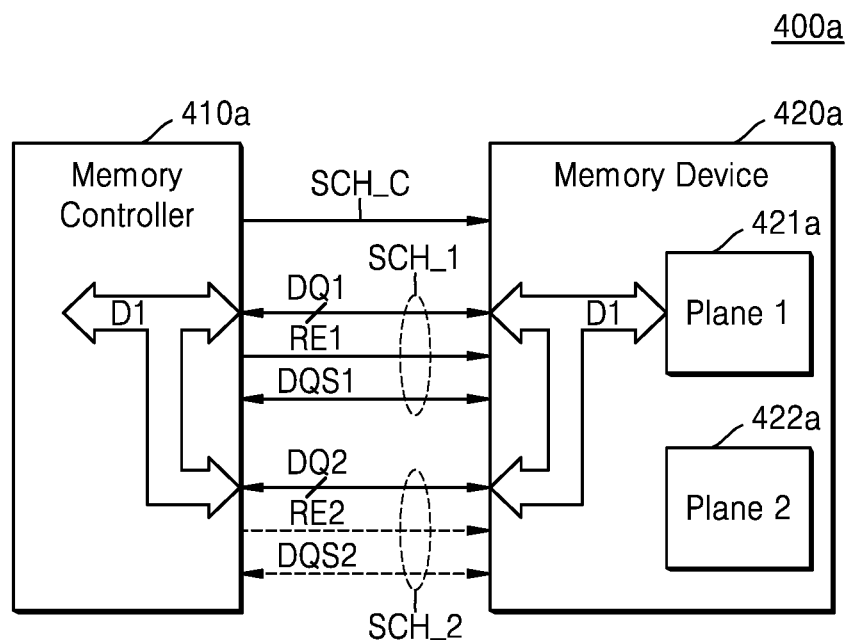
FIGS. 4A and 4B are respective block diagrams illustrating examples of operations for memory systems according to embodiments of the inventive concept.
Figure 4B:
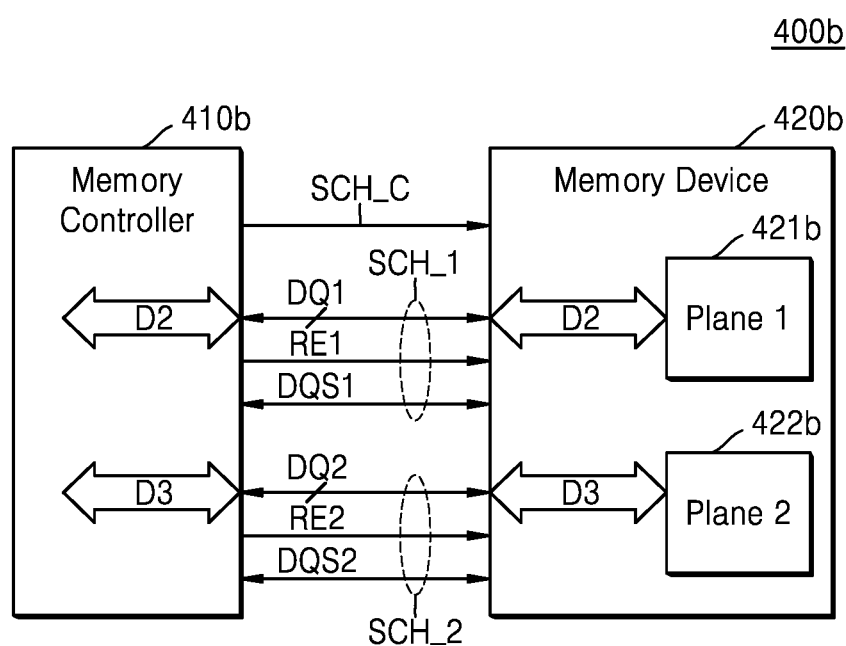

FIGS. 4A and 4B are block diagrams further illustrating examples of various operations that may be performed in memory systems according to embodiments of the inventive concept. Thus, FIG. 4A is a block diagram illustrating a memory system 400a set to the first mode, and FIG. 4B is a block diagram illustrating a memory system 400b set to the second mode.

Referring to FIGS. 3 and 4A, the memory system 400a may include a memory controller 410a and a memory device 420a, and the memory device 420a may include a first plane 421a and a second plane 422a. The memory controller 410a and the memory device 420a may communicate the first data D1 corresponding to a command (e.g., a read command or a write command) synchronized to the control sub-channel SCH_C through the first data signal DQ1 and the second data signal DQ2 in the first mode. For example, as shown in FIG. 4A, the memory controller 410a may communicate the first data D1 through the first data signal DQ1 and the second data signal DQ2. The memory device 420a may provide the first data D1 received through the first data signal DQ1 and the second data signal DQ2 to the first plane 421a or transmit the first data D1 output from the first plane 421a to the memory controller 410a through the first data signal DQ1 and the second data signal DQ2. Based on an address provided from the memory controller 410a, in contrast to the example illustrated in FIG. 4A, the memory device 420a may provide the first data D1 to the second plane 422a or transmit the first data D1 output from the second plane 422a to the memory controller 410a.

In some embodiments, the memory controller 410a may disable at least one of signal lines included in the second sub-channel SCH_2 in the first mode. For example, as indicated by a dotted arrow in FIG. 4A, the memory controller 410a may not use the second read enable signal RE2 and the second data strobe signal DQS2 in the first mode and may disable a second read enable signal and a second data strobe signal included in the second sub-channel SCH_2. Therefore, the second data signal DQ2 may be synchronized with the first data strobe signal DQS1 and may be synchronized with control signals of the control sub-channel SCH_C and the first read enable signal RE1.

Referring to FIGS. 3 and 4B, the memory system 400b may include a memory controller 410b and a memory device 420b, and the memory device 420b may include a first plane 421b and a second plane 422b. In the second mode, the memory controller 410b and the memory device 420b may communicate the second data D2 and the third data D3 corresponding to different commands (e.g., read commands, write commands, or combinations thereof) synchronized to the control sub-channel SCH_C through the first data signal DQ1 and the second data signal DQ2, respectively. For example, as shown in FIG. 4B, the memory controller 410b may communicate the second data D2 through the first data signal DQ1 and may communicate the third data D3 through the second data signal DQ2. The memory device 420b may provide the second data D2 received through the first data signal DQ1 to the first plane 421b or provide the second data D2 output from the first plane 421b to the memory controller 410b through the first data signal DQ1. Also, the memory device 420b may provide the third data D3 received through the second data signal DQ2 to the second plane 422b or provide the third data D3 output from the second plane 422b to the memory controller 410b through the second data signal DQ2. To this end, in contrast to the example illustrated in FIG. 4A, all of the signal lines included in the second sub-channel SCH_2 may be used during the second mode.

Figure 5:
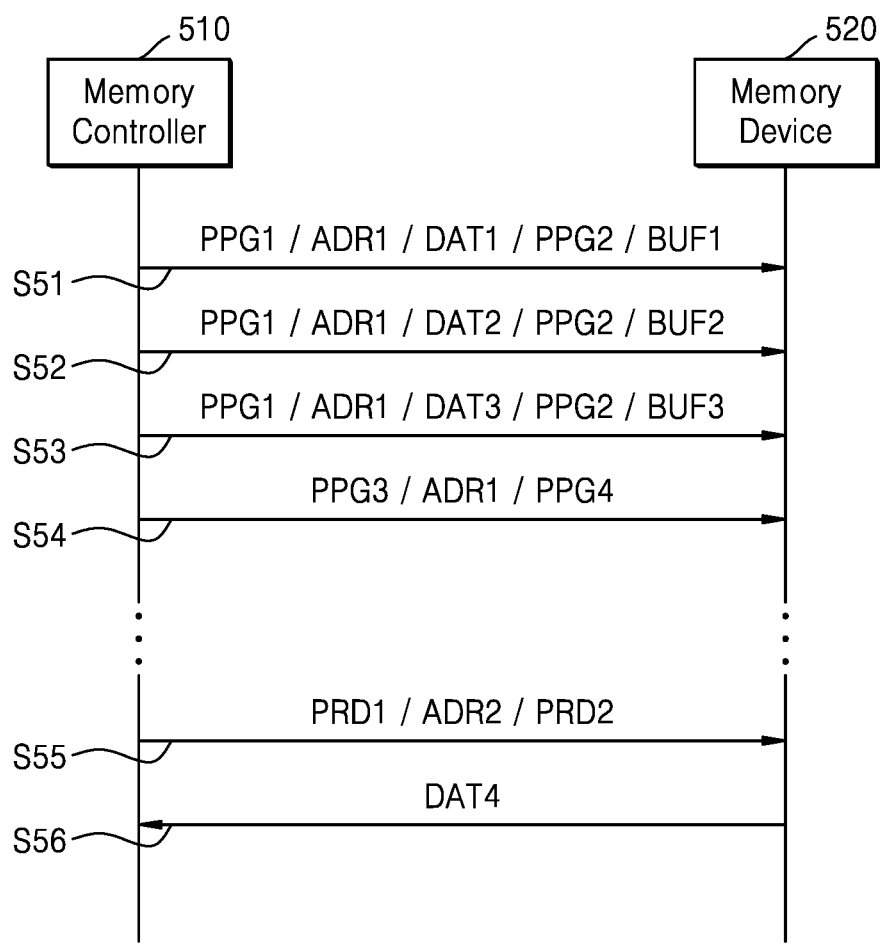
FIG. 5 is an operating diagram illustrating messaging operation of a memory system according to embodiments of the inventive concept.

FIG. 5 is an operating diagram illustrating exemplary messaging within a memory system according to embodiments of the inventive concept. That is, FIG. 5 illustrates operations S51, S52, S53 and S54 executed between a memory controller 510 and a memory device 520 during a write operation on a region corresponding to a first address ADR1, and further illustrates operations S55 and S56 executed between the memory controller 510 and the memory device 520 during a read operation on a region corresponding to a second address ADR2. In the illustrated example of FIG. 5, the memory device 520 may include cell arrays including triple level cells (TLC) each storing 3-bits and may include a page buffer including three buffers each storing page data.

Referring to FIG. 5, in operation S51, the memory controller 510 may transmit signals for storing first page data DAT1 in a first buffer to the memory device 520. For example, as shown in FIG. 5, the memory controller 510 may sequentially transmit a first page program command PPG1, the first address ADR1, the first page data DAT1, a second page program command PPG2, and a first buffer address BUF1 to the memory device 520. The first page program command PPG1 transmitted in a first command cycle may be referred to as a first cycle command, and the second page program command PPG2 transmitted in a second command cycle may be referred to as a second cycle command. The memory device 520 may store the first page data DAT1 in the first buffer in response to signals received from the memory controller 510 in operation S51. In some embodiments, the size of page data may be 16 kilobytes (kB).

In operation S52, the memory controller 510 may transmit signals for storing second page data DAT2 in a second buffer to the memory device 520. For example, as shown in FIG. 5, the memory controller 510 may sequentially transmit the first page program command PPG1, the first address ADR1, the second page data DAT2, the second page program command PPG2, and a second buffer address BUF2 to the memory device 520. The memory device 520 may store the second page data DAT2 in the second buffer in response to signals received in operation S52.

In operation S53, the memory controller 510 may transmit signals for storing third page data DAT3 in a third buffer to the memory device 520. For example, as shown in FIG. 5, the memory controller 510 may sequentially transmit the first page program command PPG1, the first address ADR1, the third page data DAT3, the second page program command PPG2, and a third buffer address BUF3 to the memory device 520. The memory device 520 may store the third page data DAT3 in the third buffer in response to signals received in operation S53.

In operation S54, the memory controller 510 may provide signals for confirmation of programming to the memory device 520. For example, as shown in FIG. 5, the memory controller 510 may transmit a third page program command PPG3 as a first cycle command and a fourth page program command PPG4 as a second cycle command to the memory device 520 and may transmit the first address ADR1 to the memory device 520 between the third page program command PPG3 and the fourth page program command PPG4. In response to signals received in operation S54, the memory device 520 may program data stored in first to third buffers, that is, first to third page data DAT1 to DAT3 to a region of a cell array corresponding to the first address ADR1.

Referring to FIG. 5, in operation S55, the memory controller 510 may transmit signals for reading data to the memory device 520. For example, as shown in FIG. 5, the memory controller 510 may transmit a first page read command PRD1 as a first cycle command and a second page read command PRD2 as a second cycle command to the memory device 520 and may transmit the second address ADR2 to the memory device 520 between the first page read command PRD1 and the second page read command PRD2. The memory device 520 may load data to the page buffer from a region of the cell array corresponding to the second address ADR2 in response to signals received in operation S55.

In operation S56, the memory device 520 may transmit fourth page data DAT4 to the memory controller 510. For example, based on the second address ADR2, the memory device 520 may transmit the fourth page data DAT4, which is at least a portion of the data loaded to the page buffer from the cell array, to the memory controller 510.

In some embodiments, the memory controller 510 may use a second cycle command to set the memory device 520 to a first mode or a second mode. For example, the memory controller 510 may use a second cycle command associated with page programming, e.g., a second page program command PPG2 and/or a fourth page program command PPG4, to set the mode of the memory device 520. Also, the memory controller 510 may use a second cycle command associated with page reading, e.g., the second page read command PRD2, to set the mode of the memory device 520. The memory device 520 may identify the first mode or the second mode from the second cycle command and may perform operations subsequent to the second cycle command based on the identified mode. Examples in which the mode of the memory device 520 is set using the second cycle command will be described hereafter in relation to FIGS. 6 and 7. Here, a command for setting the memory device 520 to a first mode may be referred to as a first command, and a command for setting the memory device 520 to a second mode may be referred to as a second command.

Figure 6:
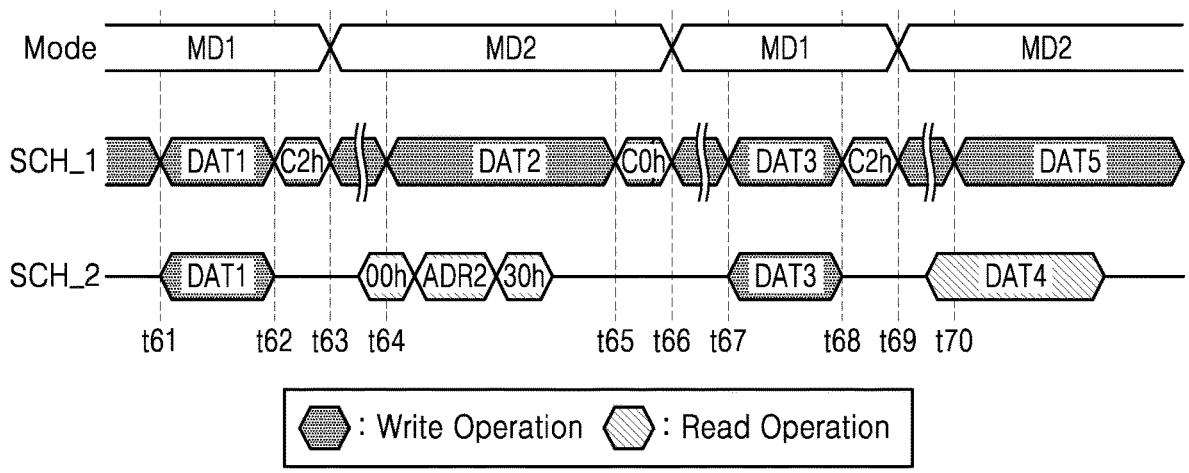
FIG. 6 is a timing diagram illustrating an operation of a memory system according to an embodiment.

FIG. 6 is a timing diagram illustrating operation of a memory system according to embodiments of the inventive concept. That is, FIG. 6 is a timing diagram illustrating an example in which the mode of a memory device is set using a second cycle command of a page programming. In some embodiments, the operation illustrated in FIG. 6 may be performed by the memory system 300 of FIG. 3. Thus, hereinafter, FIG. 6 will be described with reference to FIG. 3, and it is assumed that a write operation is performed on the first plane 324 and a read operation is performed on the second plane 325.

During a period extending between time t61 to time t62, the first page data DAT1 may be transmitted from the memory controller 310 to the memory device 320 through the first sub-channel SCH_1 and the second sub-channel SCH_2. Since the memory controller 310 and the memory device 320 are set to the first mode MD1, the first page data DAT1 may be provided to the first plane 324 through the first sub-channel SCH_1 and the second sub-channel SCH_2. Therefore, the period during which the first page data DAT1 is transmitted (i.e., the period between time t61 and time t62) may be shorter than a period during which the second page data DAT2 is transmitted in the second mode MD2 as will be described hereafter (i.e., the period between time t64 and time t65).

During a period extending between time t62 to time t63, a second cycle command (i.e., PPG2 of FIG. 5) of a page programming for setting the memory device 320 to the second mode MD2 may be transmitted from the memory controller 310 to the memory device 320 through the first sub-channel SCH_1. For example, as shown in FIG. 6, the memory controller 310 may transmit a hexadecimal number "C2h" to the memory device 320 through the first data signal DQ1, and the memory device 320 (or the control logic 323) may identify a second cycle command of a page programming. Since one bit of the first data signal DQ1 (i.e., DQ[1]) is "1", the memory device 320 may be set to the second mode MD2.

During a period extending between time t64 to time t65, the second page data DAT2 may be transmitted from the memory controller 310 to the memory device 320 through the first sub-channel SCH_1. Since the memory controller 310 and the memory device 320 are set to the second mode MD2, the second page data DAT2 may be provided to the first plane 324 through the first sub-channel SCH_1.

During a period extending between time t65 to time t66, a second cycle command (i.e., PPG2 of FIG. 5) of a page programming for setting the memory device 320 to the first mode MD1 may be transmitted from the memory controller 310 to the memory device 320 through the first sub-channel SCH_1. For example, as shown in FIG. 6, the memory controller 310 may transmit a hexadecimal number "C0h" to the memory device 320 through the first data signal DQ1, and the memory device 320 (or the control logic 323) may identify a second cycle command of a page programming. Since one bit of the first data signal DQ1 (i.e., DQ[1]) is "0", the memory device 320 may be set to the first mode MD1.

During a period during which the memory device 320 is set to the second mode MD2 (i.e., the period from time t63 to time t66), a command (e.g., a read command) and an address for reading data from the second plane 325 may be transmitted from the memory controller 310 to the memory device 320 through the second sub-channel SCH_2. For example, as shown in FIG. 6, the memory controller 310 may sequentially transmit a hexadecimal number "00h" as a first cycle command of a page reading, the second address ADR2, a hexadecimal number "30h" as a second cycle command of a page reading through the second data signal DQ2. Since the memory device 320 is set to the second mode MD2, the memory device 320 may receive a command and an address for a reading operation on the second plane 325 in parallel to a write operation on the first plane 324, and data may start to be loaded from a cell array to a page buffer in the second plane 325.

During a period extending between time t67 to time t68, the third page data DAT3 may be transmitted from the memory controller 310 to the memory device 320 through the first sub-channel SCH_1 and the second sub-channel SCH_2. Since the memory controller 310 and the memory device 320 are set to the first mode MD1, the third page data DAT3 may be provided to the first plane 324 through the first sub-channel SCH_1 and the second sub-channel SCH_2.

During a period extending between time t68 to time t69, a second cycle command (i.e., PPG2 of FIG. 5) of a page programming for setting the memory device 320 to the second mode MD2 may be transmitted from the memory controller 310 to the memory device 320 through the first sub-channel SCH_1. For example, as shown in FIG. 6, the memory controller 310 may transmit a hexadecimal number "C2h" to the memory device 320 through the first data signal DQ1, and the memory device 320 (or the control logic 323) may identify a second cycle command of a page programming. Since one bit of the first data signal DQ1 (i.e., DQ[1]) is "1", the memory device 320 may be set to the second mode MD2.

During a period beginning at time t70, fifth page data DAT5 may be transmitted from the memory controller 310 to the memory device 320 through the first sub-channel SCH_1. Since the memory controller 310 and the memory device 320 are set to the second mode MD2, the fifth page data DAT5 may be provided to the first plane 324 through the first sub-channel SCH_1.

The fourth page data DAT4 may be output from the second plane 325 after the period during which the memory device 320 is set to the second mode MD2, that is, after time t69. As described above, the second plane 325 may perform a load operation after a read command and an address are received, and the load operation may also be performed in the period during which the memory device 320 is set to the first mode MD1, that is, the period between time t66 and time t69. Therefore, after time t69 when the memory device 320 is set to the second mode MD2, a period for a load operation for the fourth page data DAT4 may be omitted and the fourth page data DAT4 may be transmitted from the memory device 320 to the memory controller 310 through the second sub-channel SCH_2.

In some embodiments, in contrast to the embodiment shown in FIG. 6, a second cycle command for a program confirmation (e.g., PPG4 of FIG. 5) may be used as a second cycle command of a page programming to set the mode of the memory device 320. For example, the memory controller 310 may transmit a hexadecimal number "10h" to the memory device 320 through the first data signal DQ1 to set the memory device 320 to the first mode. Also, the memory controller 310 may transmit a hexadecimal number "12h" to the memory device 320 through the first data signal DQ1 to set the memory device 320 to the second mode. The memory device 320 may identify a second cycle command of a program confirmation and may be set to the first mode or the second mode based on one bit of the first data signal DQ1, that is, a value of DQ[1].

Figure 7:
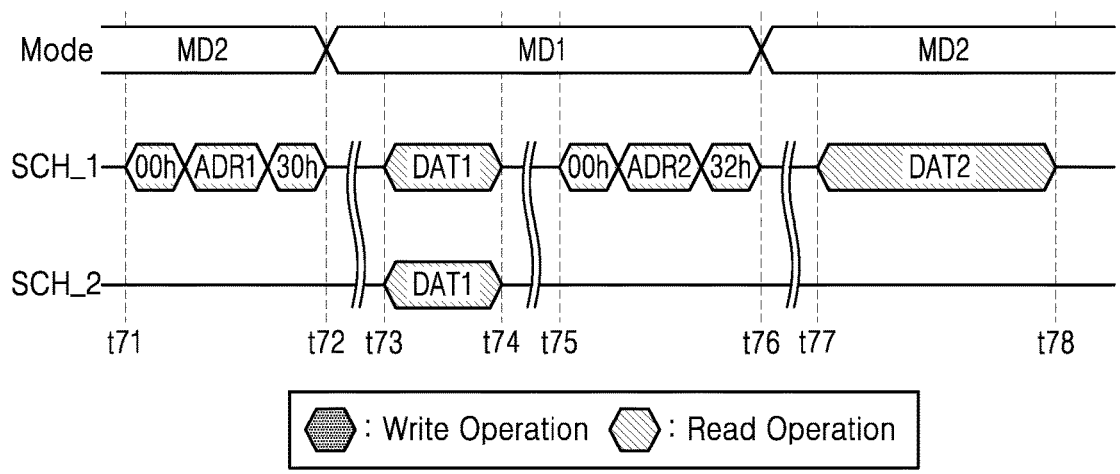

FIG. 7 is a timing diagram illustrating operation of a memory system according to embodiments of the inventive concept. That is, FIG. 7 is a timing diagram illustrating an example in which the mode of a memory device is set using a second cycle command of a page reading. In some embodiments, the operation of FIG. 7 may be performed by the memory system 300 of FIG. 3. Hereinafter, FIG. 7 will be described in relation to FIG. 3, and it is assumed that the first address ADR1 and the second addresses ADR2 correspond to regions of a cell array included in the first plane 324.

During a period extending between time t71 to time t72, a read command and an address may be transmitted from the memory controller 310 to the memory device 320 through the first sub-channel SCH_1. For example, as shown in FIG. 7, the memory controller 310 may sequentially transmit a hexadecimal number "00h" as a first cycle command of a page reading, the first address ADR1, a hexadecimal number "30h" as a second cycle command of a page reading through the first data signal DQ1. The memory device 320 (or the control logic 323) may identify a second cycle command of a page reading, and, since one bit of the first data signal DQ1 (i.e., DQ[1]) is "0", the memory device 320 may be set to the first mode MD1 from time t72.

During a period extending between time t73 to time t74, the first page data DAT1 may be transmitted from the memory device 320 to the memory controller 310 through the first sub-channel SCH_1 and the second sub-channel SCH_2. For example, a load operation may be performed in the first plane 324 from time t72, and the first page data DAT1 may be output from time t73 after the load operation is completed. Since the memory controller 310 and the memory device 320 are set to the first mode MD1, the first page data DAT1 may be transmitted from the memory device 320 to the memory controller 310 through the first sub-channel SCH_1 and the second sub-channel SCH_2. Therefore, a period during which the first page data DAT1 is transmitted (i.e., the period between time t73 and time t74) may be shorter than a period during which the second page data DAT2 is transmitted in the second mode MD2 as described hereafter (i.e., the period between time t77 and time t78).

During a period extending between time t75 to time t76, a read command and an address may be transmitted from the memory controller 310 to the memory device 320 through the first sub-channel SCH_1. For example, as shown in FIG. 7, the memory controller 310 may sequentially transmit a hexadecimal number "00h" as a first cycle command of a page reading, the second address ADR2, a hexadecimal number "32h" as a second cycle command of a page reading through the first data signal DQ1. The memory device 320 (or the control logic 323) may identify a second cycle command of a page reading, and, since one bit of the first data signal DQ1 (i.e., DQ[1]) is "1", the memory device 320 may be set to the second mode MD2 from time t76.

During a period extending between time t77 to time t78, the second page data DAT2 may be transmitted from the memory device 320 to the memory controller 310 through the first sub-channel SCH_1. For example, a load operation may be performed in the first plane 324 from time t76, and the second page data DAT2 may be output from time t77 after the load operation is completed. Since the memory controller 310 and the memory device 320 are set to the second mode MD2, the second page data DAT2 may be transmitted from the memory device 320 to the memory controller 310 through the first sub-channel SCH_1.

Figure 8:
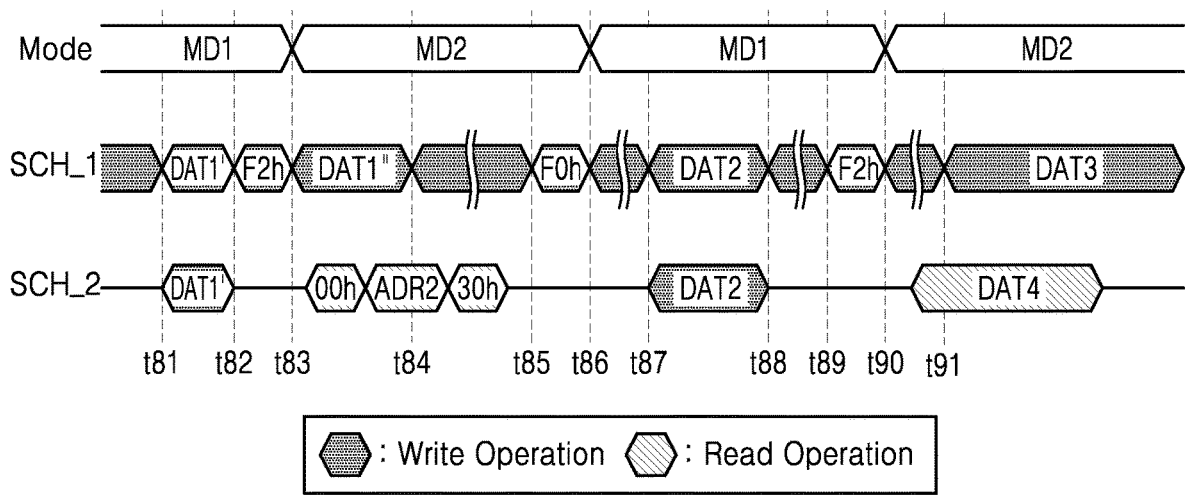

FIG. 8 is a timing diagram illustrating operation of a memory system according to embodiments of the inventive concept. That is, FIG. 8 is a timing diagram illustrating an example in which the mode of a memory device is set using an independent (or dedicated) command for mode switching. In some embodiments, the operation illustrated in FIG. 8 may be performed by the memory system 300 of FIG. 3. Thus, hereinafter, FIG. 8 will be described with reference to FIG. 3, and it is assumed that a write operation is performed on the first plane 324 and a read operation is performed on the second plane 325. Also, although commands includes a hexadecimal number "F2h" or "F0h" in the example shown in FIG. 8, it should be noted that a command for setting a mode may include an arbitrary value that is not mapped to a predefined operation in an memory interface.

During a period extending between time t81 to time t82, partial first page data DAT1' may be transmitted from the memory controller 310 to the memory device 320 through the first sub-channel SCH_1 and the second sub-channel SCH_2. Since the memory controller 310 and the memory device 320 are set to the first mode MD1, the partial first page data DAT1' may be provided to the first plane 324 through the first sub-channel SCH_1 and the second sub-channel SCH_2.

During a period extending between time t82 to time t83, a command for setting the memory device 320 to the second mode MD2 may be transmitted from the memory controller 310 to the memory device 320 through the first sub-channel SCH_1 before the transmission of first page data is completed. For example, as shown in FIG. 8, the memory controller 310 may transmit a hexadecimal number "F2h" to the memory device 320 through the first data signal DQ1, and the memory device 320 (or the control logic 323) may identify a mode switching command. Since one bit of the first data signal DQ1 (i.e., DQ[1]) is "1", the memory device 320 may be set to the second mode MD2.

During a period extending between time t83 to time t84, remaining partial first page data DAT1" may be transmitted from the memory controller 310 to the memory device 320 through the first sub-channel SCH_1. Since the memory controller 310 and the memory device 320 are set to the second mode MD2, the remaining partial first page data DAT1" may be provided to the first plane 324 through the first sub-channel SCH_1.

During a period extending between time t85 to time t86, a command for setting the memory device 320 to the first mode MD1 may be transmitted from the memory controller 310 to the memory device 320 through the first sub-channel SCH_1. For example, as shown in FIG. 8, the memory controller 310 may transmit a hexadecimal number "F0h" to the memory device 320 through the first data signal DQ1, and the memory device 320 may identify a mode switching command. Since one bit of the first data signal DQ1 (i.e., DQ[1]) is "0", the memory device 320 may be set to the first mode MD1.

In a period during which the memory device 320 is set to the second mode MD2 (i.e., the period between time t83 to time t86), a command and an address for reading data from the second plane 325 may be transmitted from the memory controller 310 to the memory device 320 through the second sub-channel SCH_2. For example, as shown in FIG. 8, the memory controller 310 may sequentially transmit a hexadecimal number "00h" as a first cycle command of a page reading, the second address ADR2, a hexadecimal number "30h" as a second cycle command of a page reading through the second data signal DQ2. Since the memory device 320 is set to the second mode MD2, the memory device 320 may receive a command and an address for a reading operation on the second plane 325 in parallel to a write operation on the first plane 324, and data may start to be loaded from a cell array to a page buffer in the second plane 325.

During a period extending between time t87 to time t88, the second page data DAT2 may be transmitted from the memory controller 310 to the memory device 320 through the first sub-channel SCH_1 and the second sub-channel SCH_2. Since the memory controller 310 and the memory device 320 are set to the first mode MD1, the second page data DAT2 may be provided to the first plane 324 through the first sub-channel SCH_1 and the second sub-channel SCH_2.

During a period extending between time t89 to time t90, a command for setting the memory device 320 to the second mode MD2 may be transmitted from the memory controller 310 to the memory device 320 through the first sub-channel SCH_1. For example, as shown in FIG. 8, the memory controller 310 may transmit a hexadecimal number "F2h" to the memory device 320 through the first data signal DQ1, and the memory device 320 (or the control logic 323) may identify a mode switching command. Since one bit of the first data signal DQ1 (i.e., DQ[1]) is "1", the memory device 320 may be set to the second mode MD2.

Beginning at time t91, the third page data DAT3 may be transmitted from the memory controller 310 to the memory device 320 through the first sub-channel SCH_1. Since the memory controller 310 and the memory device 320 are set to the second mode MD2, the third page data DAT3 may be provided to the first plane 324 through the first sub-channel SCH_1.

The fourth page data DAT4 may be output from the second plane 325 after the period during which the memory device 320 is set to the second mode MD2, that is, after time t90. As described above, the second plane 325 may perform a load operation after a read command and an address are received, and the load operation may also be performed in the period during which the memory device 320 is set to the first mode MD1 (e.g., the period between time t86 and time t90). Therefore, after time t90 when the memory device 320 is set to the second mode MD2, a period for a load operation for the fourth page data DAT4 may be omitted and the fourth page data DAT4 may be transmitted from the memory device 320 to the memory controller 310 through the second sub-channel SCH_2.

Figure 9:
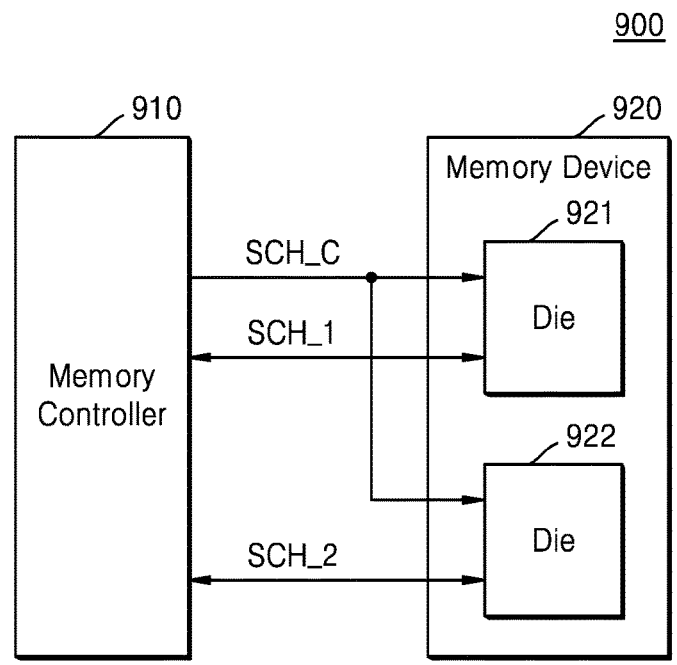
FIG. 9 is a block diagram illustrating a memory system according to embodiments of the inventive concept.

FIG. 9 is a block diagram illustrating a memory system 900 according to embodiments of the inventive concept. As shown in FIG. 9, the memory system 900 may generally include a memory controller 910 and a memory device 920, wherein the memory controller 910 and the memory device 920 communicate through the control sub-channels SCH_C, the first sub-channel SCH_1, and the second sub-channel SCH_2.

Here, the memory device 920 may include multiple dies. For example, as shown in FIG. 9, the memory device 920 may include a first die 921 and a second die 922, wherein the first die 921 and the second die 922 may be independently accessed by the memory controller 910. As shown in FIG. 9, the first die 921 and the second die 922 may share the control sub-channel SCH_C and may be connected to the memory controller 910 through the first sub-channel SCH_1 and the second sub-channel SCH_2, respectively. In some embodiments, such as the one described in relation to FIG. 3, the control sub-channel SCH_C may include signal lines through which a chip enable signal CE, a command latch enable signal CLE, an address latch enable signal ALE, and a write enable signal WE are transmitted, respectively. Also, in some embodiments, such as the one described in relation to FIG. 3, each of the first sub-channel SCH_1 and the second sub-channel SCH_2 may include data lines, a data strobe line, and a read enable line. In some embodiments, the first die 921 and the second die 922 may have the same configuration.

The memory controller 910 may perform a common operation (e.g., a write operation or a read operation) directed to the first die 921 and the second die 922 in the first mode. For example, signals transmitted through the first sub-channel SCH_1 and signals transmitted through the second sub-channel SCH_2 may be synchronized with each other. In some embodiments, the memory controller 910 may transmit the same first read enable signal RE1 and the second read enable signal RE2, and the same first data strobe signal DQS1 and the second data strobe signal DQS2 to the memory device 920 through the first sub-channel SCH_1 and the second sub-channel SCH_2, in the first mode. Also, the memory controller 910 may independently perform operations for the first die 921 and the second die 922 in the second mode. For example, the memory controller 910 may simultaneously (e.g., temporarily overlapping at least in part) perform a write operation for the first die 921 through the first sub-channel SCH_1 and perform a read operation for the second die 922 through the second sub-channel SCH_2. As described hereafter with reference to FIG. 10, the memory controller 910 may provide a command for selecting at least one die to the memory device 920 to set the mode of the memory device 920.

Figure 10:
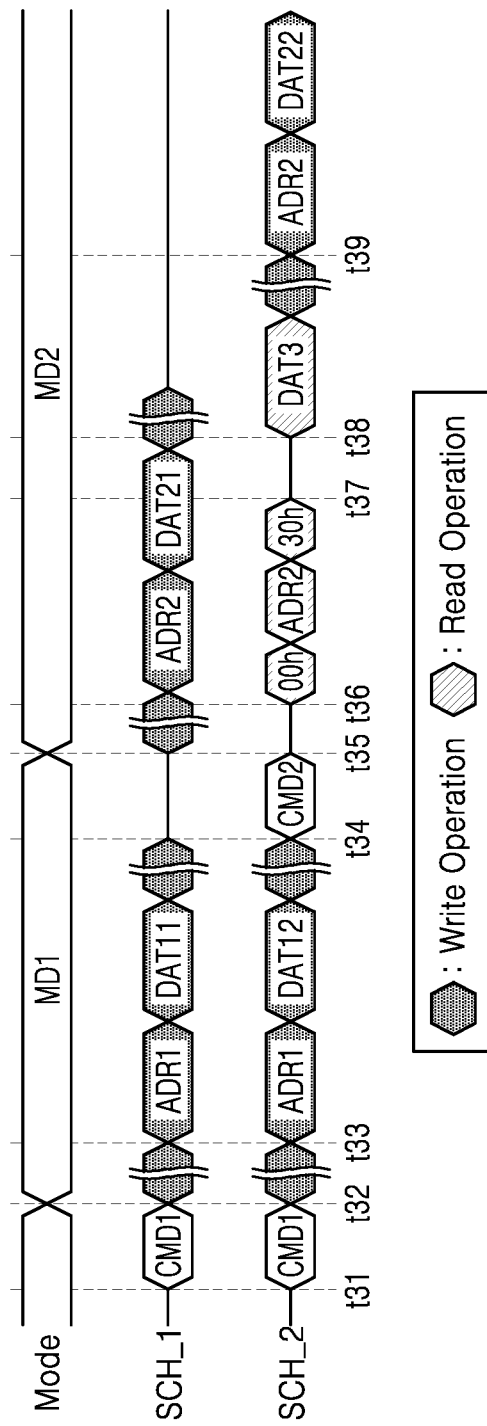

FIG. 10 is a timing diagram illustrating operation of a memory system according to embodiments of the inventive concept. That is, FIG. 10 is a timing diagram illustrating an example in which the mode of a memory device is set using a command for selecting at least one die. In some embodiments, the operation of FIG. 10 may be performed by the memory system 900 of FIG. 9. Thus, hereinafter, FIG. 10 will be described with reference to FIG. 9.

During a period extending between time t31 to time t32, a first command CMD1 for setting the memory device 920 to the first mode MD1 may be transmitted from the memory controller 910 to the memory device 920 through the first sub-channel SCH_1 and the second sub-channel SCH_2. For example, the first command CMD1 may be a command for selecting both the first die 921 and the second die 922, and the first die 921 and the second die 922 may identify the first command CMD1.

From time t33, the first address ADR1 and first data may be transmitted from the memory controller 910 to the memory device 920 through the first sub-channel SCH_1 and the second sub-channel SCH_2. For example, as shown in FIG. 10, the memory controller 910 may transmit the first address ADR1 and page data DAT11, which is a portion of the first data, to the memory device 920 through the first sub-channel SCH_1 and transmit the first address ADR1 and page data DAT12, which is another portion of the first data, to the memory device 920 through the second sub-channel SCH_2. Since the memory controller 910 and the memory device 920 are set to the first mode MD1, the first die 921 and the second die 922 may store the first data in response to a common write command.

During a period extending between time t34 to time t35, a second command CMD2 for setting the memory device 920 to the second mode MD2 may be transmitted from the memory controller 910 to the memory device 920 through the second sub-channel SCH_2. For example, the second command CMD2 may be a command for selecting the second die 922, and the second die 922 may identify the second command CMD2.

During a period extending between time t36 to time t37, a read command and an address may be transmitted from the memory controller 910 to the memory device 920 through the second sub-channel SCH_2. For example, as shown in FIG. 10, the memory controller 910 may sequentially transmit a hexadecimal number "00h" as a first cycle command of a page reading, the second address ADR2, and a hexadecimal number "30h" as a second cycle command of the page reading through a second data signal (e.g., DQ2 of FIG. 3) of the second sub-channel SCH_2. Since the memory device 920 is set to the second mode MD2, the memory device 920 may receive a command and an address for a read operation for the second die 922 in parallel to a write operation for the first die 921. For example, as shown in FIG. 10, the first die 921 may receive the second address ADR2 and page data DAT21, which is a portion of second data, from the memory controller 910 through the first sub-channel SCH_1 and store the page data DAT21. From time t37, data may start to be loaded from a cell array to a page buffer in the second die 922.

From time t38, the third page data DAT3 may be transmitted from the memory device 920 to the memory controller 910 through the second sub-channel SCH_2. For example, a load operation may be performed in the second die 922 from time t37, and the third page data DAT3 may be output from time t38 after the load operation is completed. Since the memory controller 910 and the memory device 920 are set to the second mode MD2, the third page data DAT3 may be transmitted from the memory device 920 to the memory controller 910 through the second sub-channel SCH_2.

From time t39, the second address ADR2 and page data DAT22, which is a portion of the second data, may be transmitted from the memory controller 910 to the memory device 920 through the second sub-channel SCH_2. For example, the memory controller 910 may transmit the page data DAT22 to the second die 922, which is the remaining portion of the second data except for the page data DAT21 written to the first die 921. Therefore, writing of the page data DAT22 may be delayed due to reading of the third page data DAT3, but the reading of the third page data DAT3 may be completed early.

Figure 11:
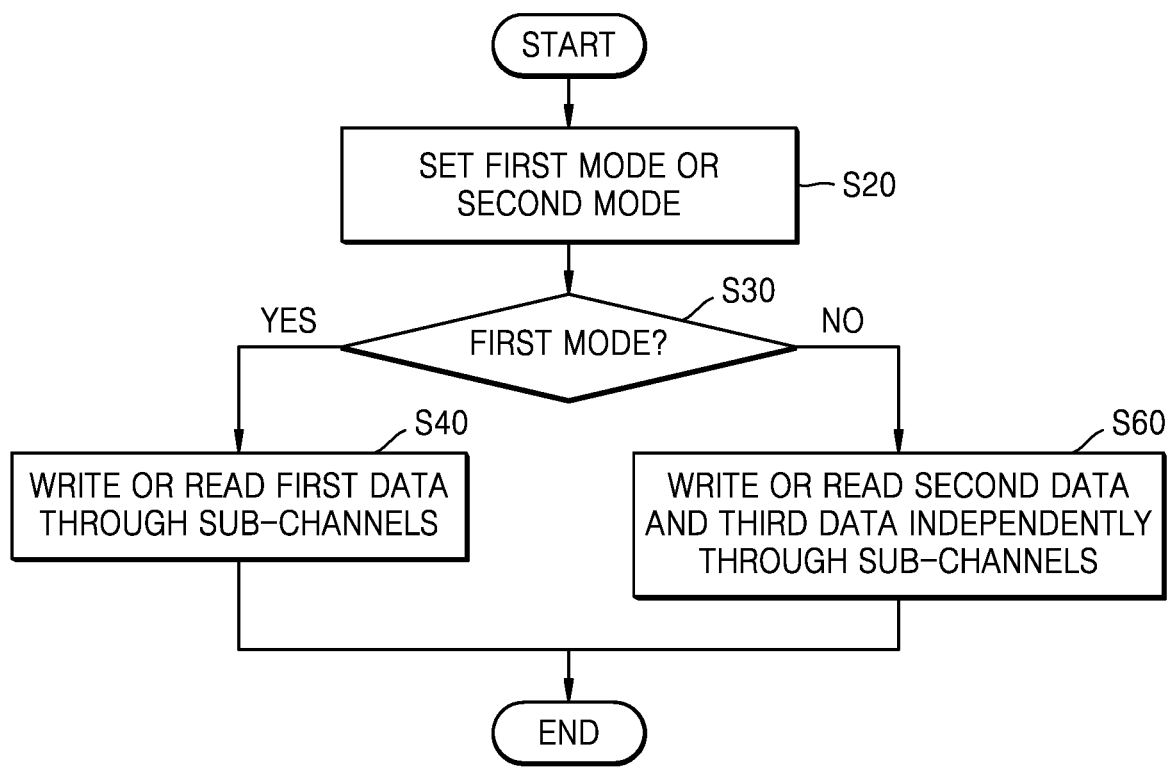
FIG. 11 is a flowchart illustrating in one example a method of operating a memory interface including a reconfigurable channel according to embodiments of the inventive concept.

FIG. 11 is a flowchart illustrating in one example a method of operation for a memory interface including a reconfigurable channel according to embodiments of the inventive concept. In some embodiments, the method of FIG. 11 may be performed by the memory controller 110 of FIG. 1. Thus, the method of FIG. 11 will be described with reference to FIG. 1.

Referring to FIG. 11, in operation S20, a first mode or a second mode may be set. For example, the memory controller 110 may determine an optimal mode from between the first mode and the second mode, set the memory controller 110 to a determined mode, and provide a command for setting the memory device 120 to the determined mode to the memory device 120. One example of operation S20 will be described hereafter with reference to FIG. 12.

Thereafter, in operation S30, a determination is made as to whether the first mode is set.

When the first mode is set (S30=YES), first data may be written or read through the sub-channels SCH_1, SCH_2 in operation S40. For example, the memory controller 110 may write or read first data corresponding to a command synchronized to the control sub-channel SCH_C to or from the memory device 120 through the sub-channels SCH_1, SCH_2. Since the sub-channels SCH_1, SCH_2 are used simultaneously, high throughput may be achieved in the first mode.

However, when the first mode is not set and the second mode is set (S30=NO), second data and third data may be written or read independently from each other through each of the sub-channels SCH_1, SCH_2 in operation S60. The memory controller 110 may write second data and third data respectively corresponding to different commands synchronized to the control sub-channel SCH_C through the sub-channels SCH_1, SCH_2. For example, the memory controller 110 may write (or read) second data corresponding to a write command (or a read command) synchronized to the control sub-channel SCH_C to (or from) the memory device 120 through the first sub-channel SCH_1 and, at the same time, may read (or write) third data corresponding to a read command (or a write command) synchronized to the control sub-channel SCH_C from (or to) the memory device 120 through the second sub-channel SCH_2. In some embodiments, such as the one described in relation to FIG. 3, in the second mode, the memory controller 110 may generate a plurality of read enable signals corresponding to respective sub-channels independently from one another. Since the sub-channels SCH_1, SCH_2 are used independently from one another, low latency may be achieved in the second mode.

Figure 12:
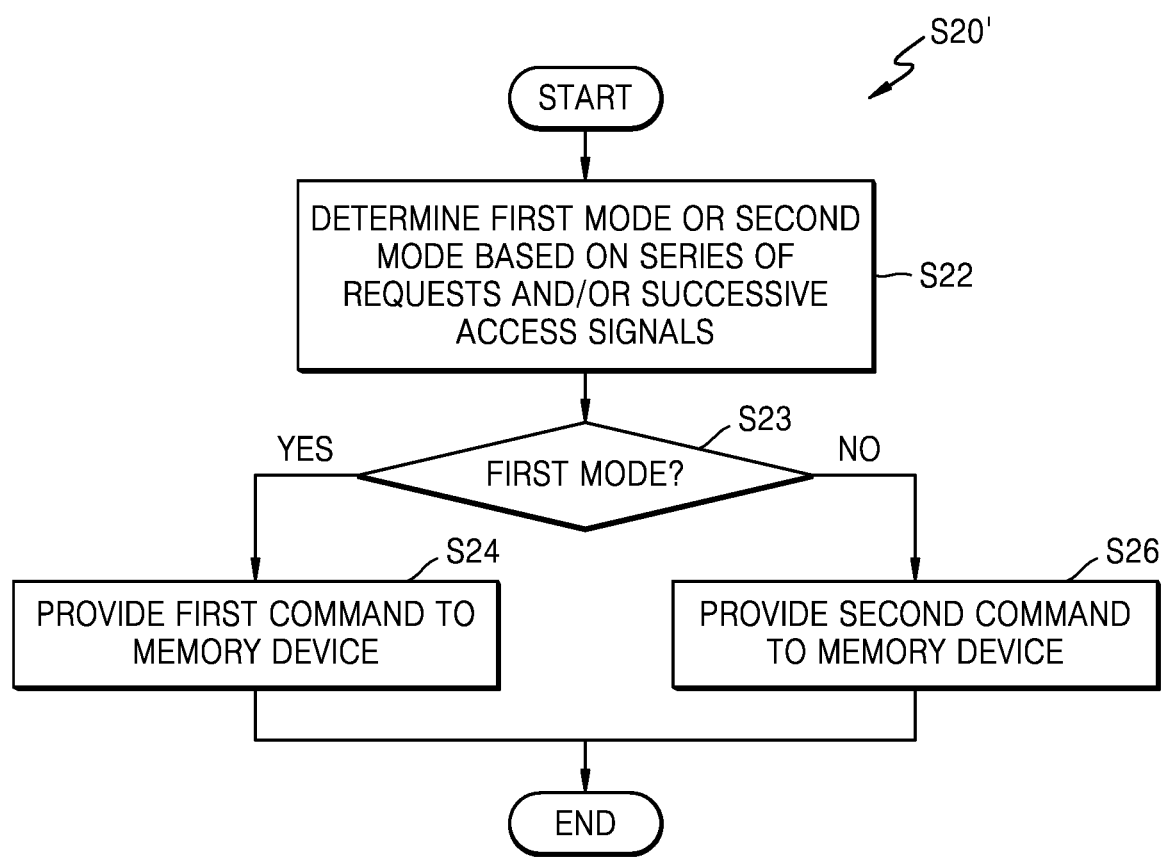
FIG. 12 is a flowchart further illustrating in one example the method step S20 of FIG. 11.

FIG. 12 is a flowchart further illustrating one example (S20') of the method step S20 of FIG. 11 according to embodiments of the inventive concept. Consistent with the method FIG. 11, a first mode or a second mode may be set during operation S20' of FIG. 12.

Referring to FIGS. 1 and 12, in operation S22, the first mode or the second mode may be determined based on a series of requests and/or successive access signals. In some embodiments, the memory controller 110 or a control circuit (e.g., 313 of FIG. 3) included in the memory controller 110 may determine the first mode or the second mode based on a series of requests provided from the host 200. For example, the memory controller 110 may determine the first mode when requests indicating the same operation (e.g., a write operation or a read operation) are successively received and determine the second mode when requests instructing different operations (e.g., a write operation and a read operation) are received in an intermixed manner.

In some embodiments, the memory controller 110 or a control circuit (e.g., 313 of FIG. 3) included in the memory controller 110 may determine the first mode or the second mode based on successive access signals provided from the host 200. For example, the host 200 may provide successive access signals indicating that a series of requests corresponding to the same operation will be provided separately from a write request and a read request to the memory system 100. The memory controller 110 may determine the first mode based on successive access signals. In some embodiments, when a request REQ indicating a different operation is received in a state in which the first mode is set, the memory controller 110 may determine the second mode, perform an operation corresponding to the request REQ, and then determine the first mode again.

In operation S23, a determination is made as to whether the first mode is set.

When the first mode is determined (S23=YES), a first command may be provided to the memory device 120 in operation S24. Alternately, when the first mode is not determined and second mode is determined (S23=NO), a second command may be provided to the memory device 120 in operation S26. In some embodiments, as described above with reference to FIGS. 6 and 7, the memory controller 110 may set the mode of the memory device 120 through a second cycle command. Also, in some embodiments, as described above with reference to FIG. 8, the memory controller 110 may set the mode of the memory device 120 through a command dedicated for setting a mode. Also, in some embodiments, as described above with reference to FIG. 10, the memory controller 110 may set the mode of the memory device 120 through a command for selecting at least one die.

Figure 13:
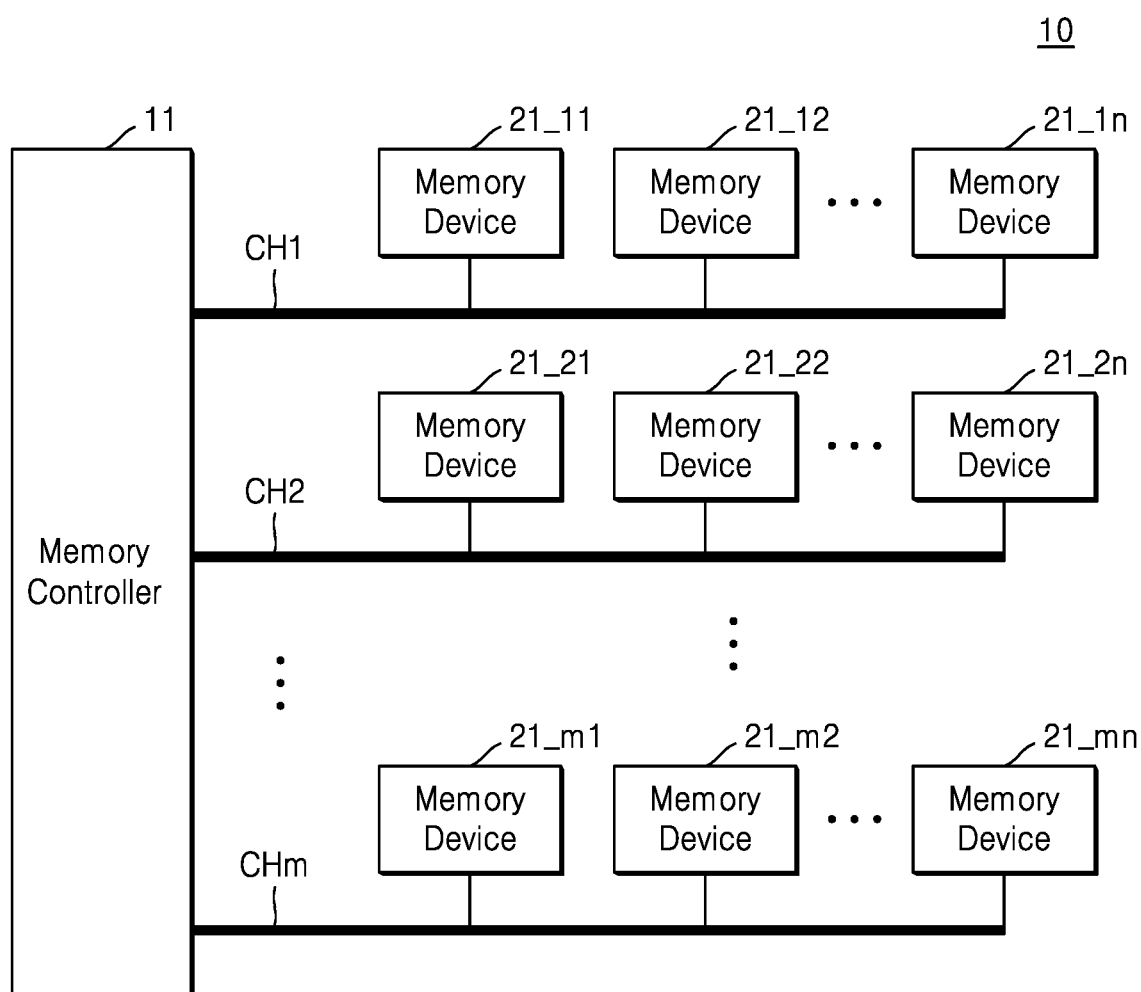
FIG. 13 is a block diagram illustrating a memory system according to embodiments of the inventive concept.

FIG. 13 is a block diagram illustrating a memory system 10 according to embodiments of the inventive concept. As shown in FIG. 13, the memory system 10 may include a memory controller 11, a plurality of first memory devices 21_11 to 21_1n, a plurality of second memory devices 21_21 to 21_2n, and a plurality of m-th memory devices 21_m1 to 21_mn, where 'm' and 'n' are positive integers).

In some embodiments, the memory controller 11 may access a plurality of memory devices through a plurality of channels. For example, as shown in FIG. 13, the memory controller 11 may access the first memory devices 21_11 to 21_1n through a first channel CH1, and the first memory devices 21_11 to 21_1n may share the first channel CH1. Also, the memory controller 11 may access the second memory devices 21_21 to 21_2n through a second channel CH2, and the second memory devices 21_21 to 21_2n may share the second channel. Also, the memory controller 11 may access the m-th memory devices 21_m1 to 21_mn through an m-th channel CHm, and the m-th memory devices 21_m1 to 21_mn may share the m-th channel CHm.

First to m-th channels CH1 to CHm may each include a plurality of sub-channels. For example, the first to m-th channels CH1 to CHm may each include the control sub-channel SCH_C, the first sub-channel SCH_1, and the second sub-channel SCH_2, as described above with reference to FIG. 1. The memory controller 11 may determine a first mode or a second mode in each of the first to m-th channels CH1 to CHm based on requests and/or successive access signals provided from the host (e.g., 200 of FIG. 1) and may set a plurality of memory devices connected to each channel to the first mode or the second mode. Therefore, a mode may be set in each of the first to m-th channels CH1 to CHm independently from one another.

Figure 14:
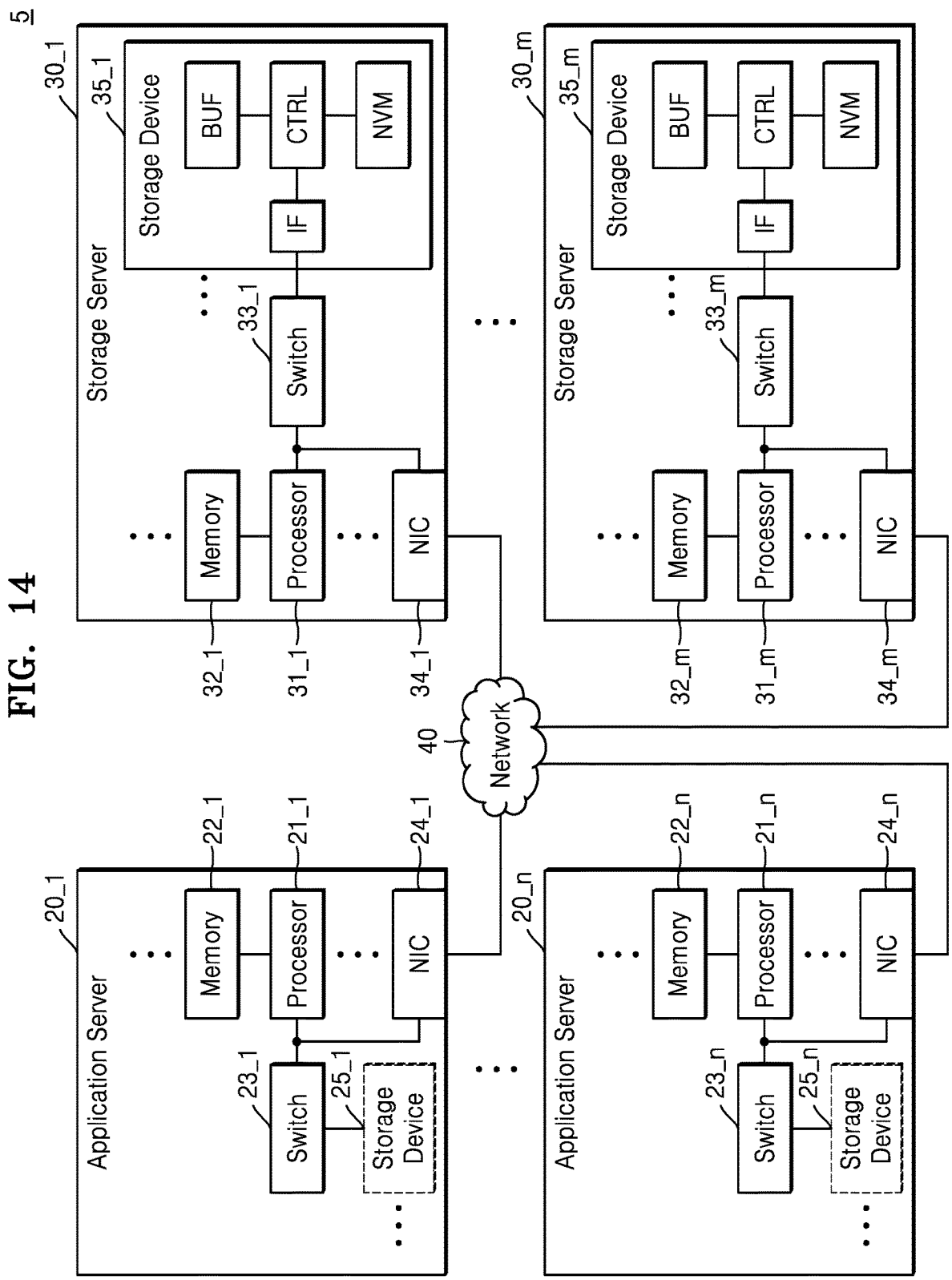
FIG. 14 is a block diagram illustrating a data center including a memory system according to embodiments of the inventive concept.

FIG. 14 is a block diagram illustrating a data center 5 including a memory system according to embodiments of the inventive concept. In some embodiments, the memory system described above with reference to the drawings may be included in the data center 5 as a storage device (e.g., 351).

Referring to FIG. 14, the data center 5 may collect various data and provide services and may also be referred to as a data storage center. For example, the data center 5 may be a system for operating a search engine and a database or may be a computing system used by a company like a bank or a government agency. As shown in FIG. 14, the data center 5 may include application servers 20_1 to 20_n and storage servers 30_1 to 30_m (m and n are integers greater than 1). The number n of the application servers 20_1 to 20_n and the number m of the storage servers 30_1 to 30_m may be variously selected according to embodiments, and the number n of the application servers 20_1 to 20_n and the number m of the storage servers 30_1 to 30_m may be different from each other (m≠n).

An application server 20_1 or 20_n may include at least one of a processor 21_1 or 21_n a memory 221 or 22_n, a switch 23_1 or 23_n, a network interface controller (NIC) 241 or 24_n, and a storage device 25_1 or 25_n. The processor 21_1 or 21_n may control the overall operation of the application server 20_1 or 20_n and execute instructions and/or data loaded to the memory 22_1 or 22_n by accessing the memory 22_1 or 22_n. The memory 22_1 or 22_n may include, as non-limiting examples, a double data rate synchronous DRAM (DDR SDRAM), a high bandwidth memory (HBM), a hybrid memory cube (HMC), a dual in-line memory module (DIMM), an optane DIMM, or a non-volatile memory DIMM (NVMDIMM). According to embodiments, the number of processors and the number of memories included in the application server 20_1 or 20_n may be variously selected. In some embodiments, the processor 21_1 or 21_n and the memory 22_1 or 22_n may provide a processor-memory pair. In some embodiments, the number of processors 21_1 or 21_n and memories 22_1 or 22_n may be different from each other. The processor 21_1 or 21_n may include a single core processor or a multiple core processor. In some embodiments, as indicated by a dotted line in FIG. 14, the storage device 25_1 or 25_n may be omitted from the application server 20_1 or 20_n. The number of storage devices 25_1 or 25_n included in the application server 20_1 or 20_n may be variously selected according to embodiments.

A storage server 30_1 or 30_m may include at least one of a processor 31_1 or 31_m, a memory 321 or 32_m, a switch 33_1 or 33_m, a NIC 34_1 or 34_m, and a storage device 35_1 or 35_m. The processor 31_1 or 31_m and the memory 321 or 32_m may operate similarly as the processor 21_1 or 21_n and the memory 22_1 or 22_n of the application server 20_1 or 20_n described above.

The application servers 20_1 to 20_n and the storage servers 30_1 to 30_m may communicate with each other through a network 40. In some embodiments, the network 40 may be implemented by using a fiber channel (FC) or Ethernet. The FC may be a medium used for relatively high-speed data transmission, and an optical switch providing high performance/high availability may be used. The storage servers 30_1 to 30_m may be provided as file storages, block storages, or object storages according to accessing methods of the network 40.

In some embodiments, the network 40 may be a storage-only network like a storage area network (SAN). For example, the SAN may use an FC network and may be an FC-SAN implemented according to an FC Protocol (FCP). Alternatively, the SAN may be an IP-SAN that uses a TCP/IP network and is implemented according to an iSCSI (SCSI over TCP/IP or Internet SCSI) protocol. In some embodiments, the network 40 may be a general network like a TCP/IP network. For example, the network 40 may be implemented according to protocols like FC over Ethernet (FCoE), Network Attached Storage (NAS), and NVMe over Fabrics (NVMe-oF).

Hereinafter, the application server 20_1 and the storage server 30_1 are mainly described, but it should be noted that the description of the application server 20_1 may also be applied to other application servers (e.g., 20_n) and the description of the storage server 30_1 may also be applied to other storage servers (e.g., 30_m).

The application server 20_1 may store data requested to be stored by a user or a client in one of the storage servers 30_1 to 30_m through the network 40. Also, the application server 20_1 may obtain data requested to be read by a user or a client from one of the storage servers 30_1 to 30_m through the network 40. For example, the application server 201 may be implemented as a web server or a database management system (DBMS).

The application server 201 may access the memory 22_n and/or the storage device 25_n included in another application server 20_n through the network 40 and/or access the memories 32_1 to 32_m and/or the storage devices 35_1 to 35_m included in the memory servers 30_1 to 30_m through the network 40. Therefore, the application server 20_1 may perform various operations on data stored in the application servers 20_1 to 20_n and/or the storage servers 30_1 to 30_m. For example, the application server 201 may execute an instruction for moving or copying data between the application servers 20_1 to 20_n and/or the storage servers 30_1 to 30_m. At this time, data may be moved from storage devices 35_1 to 35_m of storage servers 30_1 to 30_m to the memories 22_1 to 22_n of the application servers 20_1 to 20_n through the memories 32_1 to 32_m of the storage servers 30_1 to 30_m or directly. In some embodiments, data moving through the network 40 may be data encrypted for security or privacy.

In the storage server 30_1, an interface IF may provide a physical connection between the processor 31_1 and a controller CTRL and a physical connection between an NIC 34_1 and the controller CTRL. For example, the interface IF may be implemented as a direct attached storage in which the storage device 35_1 is directly accessed through a dedicated cable. Also, for example, the interface IF may be implemented as one of various interface protocols like advanced technology attachment (ATA), serial ATA (SATA), external SATA (e-SATA), small computer system interface (SCSI), serial attached SCSI (SAS), peripheral component interconnection (PCI), PCI express (PCIe), NVM express (NVMe), IEEE 1394, universal serial bus (USB), a secure digital (SD) card, a multi-media card (MMC), an embedded multi-media card (eMMC), universal flash storage (UFS), an embedded universal flash storage (eUFS), and a compact flash (CF) card interface.

In the storage server 30_1, a switch 33_1 may selectively connect the processor 31_1 and the storage device 35_1 under the control of the processor 31_1 and may selectively connect the NIC 34_1 and the storage device 35_1.

In some embodiments, the NIC 34_1 may include a network interface card, a network adapter, etc. The NIC 341 may be connected to the network 40 through a wired interface, a wireless interface, a Bluetooth interface, an optical interface, etc. The NIC 34_1 may include an internal memory, a DSP, a host bus interface, etc., and may be connected to the processor 31_1 and/or the switch 33_1 through the host bus interface. In some embodiments, the NIC 34_1 may be integrated with at least one of the processor 31_1, the switch 33_1, and the storage device 35_1.

The processors 21_1 to 21_n or 31_1 to 31_m in the application servers 20_1 to 20_n or the storage server 30_1 to 30_m may program or read data by transmitting commands to the storage devices 25_1 to 25_n or 35_1 to 35_m or the memories 22_1 to 22_n or 32_1 to 32_m. In this case, the data may be data that is error-corrected through an error correction code (ECC) engine. Data is data processed through data bus inversion (DBI) or data masking (DM) and may include cyclic redundancy code (CRC) information. Data may be data encrypted for security or privacy.

In response to the read command received from the processors 21_1 to 21_n and 31_1 to 31_m, the storage devices 25_1 to 25_n and 35_1 to 35_m may transmit control signals and command/address signals to a nonvolatile memory device NVM (e.g., a NAND flash memory device). Therefore, when data is read from the non-volatile memory device NVM, a read enable signal may be input as a data output control signal and serve to output data to a DQ bus. A data strobe signal may be generated by using a read enable signal. A command/address signal may be latched according to a rising edge or a falling edge of a write enable signal.

The controller CTRL may control the overall operation of the storage device 35_1. In an embodiment, the controller CTRL may include a static random access memory (SRAM). The controller CTRL may write data to the nonvolatile memory device NVM in response to a write command or read data from the non-volatile memory device NVM in response to a read command. For example, a write command and/or a read command may be generated based on a request provided by a host, e.g., the processor 31_1 in the storage server 30_1, the processor 31_m in another storage server 30_m, or the processor 21_1 or 21_n in the application server 20_1 or 20_n. A buffer BUF may temporarily store (buffer) data to be written to the non-volatile memory device NVM or data read from the non-volatile memory device NVM. In some embodiments, the buffer BUF may include a DRAM. Also, the buffer BUF may store meta data, and the meta data may refer to user data or data generated by the controller CTRL to manage the non-volatile memory device NVM. The storage device 35_1 may include a secure element (SE) for security or privacy.

While the inventive concept has been particularly shown and described with reference to embodiments thereof, it will be understood that various changes in form and details may be made therein without departing from the spirit and scope of the following claims.

What is claimed is:

1. A storage device comprising:
   a nonvolatile memory including a first region and a second region; and
   a controller coupled to the nonvolatile memory,
   wherein in a first mode, the controller is configured to perform a first operation by communicating with the first region of the nonvolatile memory via both a first sub-channel and a second sub-channel, in a second mode, the controller is configured to perform a second operation by communicating with the first region of the nonvolatile memory via the first sub-channel and to perform a third operation by communicating with the second region of the nonvolatile memory via the second sub-channel, the controller is configured to perform the second operation during a first time period and the third operation during a second time period, and a first time period is at least partially overlapped a second time period.

2. The storage device of claim 1, wherein each of the first operation and the second operation is a write operation, and the third operation is a read operation.

3. The storage device of claim 1, wherein the controller is configured to perform the second operation and the third operation at the same time.

4. The storage device of claim 1, wherein the controller selects one of the first mode and the second mode, based on a request received from an external device.

5. The storage device of claim 4, wherein the controller selects the first mode when multiple read requests are successively received or when multiple write requests are successively received.

6. The storage device of claim 4, wherein the controller selects the second mode when read requests and write requests are non-sequentially received.

7. The storage device of claim 1, further comprising:
a first interface circuit connected to the nonvolatile memory through the first sub-channel; and
a second interface circuit connected to the nonvolatile memory through the second sub-channel.

8. A storage device comprising:
a nonvolatile memory including a first region and a second region; and
a controller coupled to the nonvolatile memory, and configured to select one of a first mode and a second mode based on a request received from an external device,
wherein in the first mode, the controller is configured to perform a first operation by communicating with the nonvolatile memory via both a first channel and a second channel,
in the second mode, the controller is configured to perform a second operation by communicating with the nonvolatile memory via the first channel and to perform a third operation by communicating with the nonvolatile memory via the second channel,
the controller is configured to perform the second operation and the third operation, and
the second operation is performed while the third operation is performed.

9. The storage device of claim 8, wherein in the first mode, the controller performs the first operation by communicating with the first region of the nonvolatile memory via both a first channel and a second channel, and
in the second mode, the controller performs the second operation by communicating with the first region of the nonvolatile memory via the first channel and performs the third operation by communicating with the second region of the nonvolatile memory via the second channel.

10. The storage device of claim 8, wherein each of the first operation and the second operation is a write operation, and the third operation is a read operation.

11. The storage device of claim 8, wherein the controller is configured to perform the second operation and the third operation at the same time.

12. The storage device of claim 8, wherein the controller selects the first mode when multiple read requests are successively received or when multiple write requests are successively received.

13. The storage device of claim 8, wherein the controller selects the second mode when read requests and write requests are non-sequentially received.

14. The storage device of claim 8, further comprising: a first interface circuit connected to the nonvolatile memory through the first channel; a second interface circuit connected to the nonvolatile memory through the second channel; and a third interface circuit connected to the nonvolatile memory through a control channel through which the controller provides a control signal to the nonvolatile memory.

15. A storage device comprising:
a nonvolatile memory including a first region and a second region; and
a controller coupled to the nonvolatile memory, and configured to select one of a first mode and a second mode,
wherein in the first mode, the controller is configured to perform a first operation by communicating first data with the first region of the nonvolatile memory via both a first channel and a second channel,
in the second mode, the controller is configured to perform a second operation by communicating second data with the first region of the nonvolatile memory via the first channel and to perform a third operation by communicating third data with the second region of the nonvolatile memory via the second channel,
the controller is configured to provide a control signal to the nonvolatile memory via a third channel,
the controller is configured to perform the second operation during a first time period and the third operation during a second time period, and
a first time period is at least partially overlapped a second time period.

16. The storage device of claim 15, wherein each of the first operation and the second operation is a write operation, and
the third operation is a read operation.

17. The storage device of claim 15, wherein the controller is configured to perform the second operation and the third operation at the same time.

18. The storage device of claim 15, wherein the controller selects one of the first mode and the second mode, based on a request received from an external device.

19. The storage device of claim 15, wherein the controller selects the first mode when multiple read requests are successively received or when multiple write requests are successively received, and
the controller selects the second mode when read requests and write requests are non-sequentially received.

20. The storage device of claim 15, further comprising:
a first interface circuit connected to the nonvolatile memory through the first channel;
a second interface circuit connected to the nonvolatile memory through the second channel; and
a third interface circuit connected to the nonvolatile memory through the third channel.

* * * * *